(12) United States Patent
Kim et al.

(10) Patent No.: US 9,054,356 B2
(45) Date of Patent: Jun. 9, 2015

(54) BATTERY PACK (75) Inventors: Ki-Woong Kim, Yongin-si (KR);
Jae-Hoon Choi, Yongin-si (KR); Jae-Uk Ryu, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 192 days.

(21) Appl. No.: 13/554,885

(22) Filed: Jul. 20, 2012

(65) Prior Publication Data
US 2013/0196180 A1 Aug. 1, 2013

Related U.S. Application Data (60) Provisional application No. 61/591,561, filed on Jan. 27, 2012.

(51) Int. Cl.
| H01M 2/02 | (2006.01) |
| H01M 2/10 | (2006.01) |
| H01M 10/42 | (2006.01) |
| H01M 10/44 | (2006.01) |
| H01M 10/48 | (2006.01) |

(52) U.S. Cl.
CPC ........ *H01M 2/1055* (2013.01); *H01M 10/4257* (2013.01); *H01M 10/441* (2013.01); *H01M 10/486* (2013.01); *H01M 2200/00* (2013.01); *H01M 2220/30* (2013.01)

(58) Field of Classification Search
None
See application file for complete search history.

(56) References Cited

U.S. PATENT DOCUMENTS

| 7,479,786 | B2 | 1/2009 | Woo et al. | |
| 2005/0133206 | A1* | 6/2005 | Scott | 165/122 |
| 2006/0028183 | A1* | 2/2006 | Izawa et al. | 320/150 |
| 2009/0286143 | A1* | 11/2009 | Matthias et al. | 429/90 |

FOREIGN PATENT DOCUMENTS

| JP | 2002124305 A | 4/2002 |
| JP | 2007141782 A | 6/2007 |
| KR | 1020060039377 A | 5/2006 |

* cited by examiner

*Primary Examiner* — Patrick Ryan
*Assistant Examiner* — Wyatt McConnell
(74) *Attorney, Agent, or Firm* — Robert E. Bushnell, Esq.

(57) ABSTRACT

A battery pack having at least two battery cells arranged parallel to each other, a protection circuit module adjacent to at least one of the battery cells, and a temperature measuring member attached to the protection circuit module and extending between, and in contact with, the two battery cells, the temperature measuring member measuring a temperature of one of the battery cells, the temperature measuring member being fixedly and removably attached to the at least one of the battery cells.

15 Claims, 6 Drawing Sheets

BATTERY PACK

CLAIM OF PRIORITY

This application makes reference to, incorporates the same herein, and claims all benefits accruing under 35 U.S.C. §119 from an application earlier filed in the U.S. Patent and Trademark Office on the 27 Jan. 2012 and there duly assigned Ser. No. 61/591,561.

BACKGROUND OF THE INVENTION

1. Field of the Invention

An aspect of the present invention relates to a battery pack, and more particularly, to a battery pack including a protection circuit module having a plurality of battery cells and a temperature measuring member.

2. Description of the Related Art

With the rapid development of electronic and communication industries, portable electronic devices have recently come into wide use. Rechargeable batteries are widely used as power sources of the portable electronic devices in consideration of economical efficiency. For example, the batteries can be used not only in cellular phones or notebook computers but also in medium- and large-sized apparatuses such as machine tools, electric bicycles and automobiles, which require high output and high power. In this case, a battery pack is manufactured and used by connecting a plurality of batteries in series and/or parallel.

Lithium or the like may be used in the inside of a battery, and the stability of the lithium having high chemical reactivity is problematic. Particularly, various protection devices are used in a battery pack including a plurality of batteries so as to ensure the safety of the battery pack. A temperature measuring member as one of the protection devices measures a temperature of the battery before the battery pack generates heat or fire, and provided the measured temperature to a protection circuit module, thereby improving the safety of the battery pack.

SUMMARY OF THE INVENTION

Embodiments provide a battery pack using a new temperature measuring member.

Embodiments also provide a battery pack having an improved temperature control capability of battery cells.

According to an aspect of the present invention, there is provided a battery pack having at least two battery cells arranged parallel to each other, a protection circuit module adjacent to at least one of the battery cells, and a temperature measuring member attached to the protection circuit module and extending between, and in contact with, the two battery cells, the temperature measuring member measuring a temperature of one of the battery cells.

The temperature measuring member may include a body portion encasing a temperature measuring head portion to measure a temperature of one of the battery cells, and lead lines connecting the head portion to the protection circuit module, and may include an extending portion extending a predetermined length from the body portion, the extending portion may be inserted between the two battery cells and may fix the encased head portion to one of the battery cells.

The extending portion may have a tapered distal end enabling the extending portion to be inserted between the two battery cells.

The extending portion may be formed into a shape corresponding to an outer surface of one of the battery cells.

The extending portion may include a first extending portion and a second extending portion, the first extending portion may be formed into a first shape corresponding to an outer surface of one of the battery cells, and the second extending portion may be formed into a second shape corresponding to an outer surface of the other battery cell after being inserted between the two battery cells.

The extending portion may be provided with a stopper, the stopper may control the extending portion inserted between the two battery cells to a predetermined length.

The stopper may be adjacent to and spaced apart from the measuring head portion, the stopper may limit the extending portion inserted between the two battery cells to a predetermined length.

The extending portion may encase a flexible wire to enable the extending portion to be formed into a desired shape after being inserted between the two battery cells to fix the extending portion between the two battery cells.

The body portion and the extending portion may be provided with first film layers and second film layers, respectively, the first film layers of the body portion may encase a first adhesive layer, the head portion and the lead lines, and the second film layers of the extending portion may encase a second adhesive layer.

The body portion and the extending portion may be separately formed and attached to each other to form the temperature measuring member.

The body portion may be made of a first material and the extending portion may be made of a second material different from the first material.

The extending portion may be formed into an arcuate shape.

The extending portion may be provided with a stopper having at least one protrusion. The body portion may have a first thickness and the extending portion may have a second thickness less than the first thickness.

The body portion may have a first thickness and the extending portion may be tapered from the first thickness to a second thickness less than the first thickness.

According to another aspect of the present invention, there is provided a battery pack that may include at least two battery cells arranged parallel to each other, a protection circuit module adjacent to at least one of the battery cells, and a temperature measuring member measuring a temperature of one of the battery cells, the temperature measuring member may be fixedly and removably attached to at least one of the battery cells and may extend between the two battery cells, the temperature measuring member may provide a signal the protection circuit module in response to the measured temperature.

The temperature measuring member may be composed of a body portion encasing a temperature measuring head portion to measure the temperature of one of the battery cells, and lead lines connecting the head portion to the protection circuit module, and an extending portion that may extend a predetermined length from the body portion, the extending portion may be inserted between the two battery cells and may fix the encased head portion to one of the battery cells.

The extending portion may be formed into a shape corresponding to an outer surface of one of the battery cells to fix the encased head portion to the battery cell.

The extending portion may be formed into a desired shape to fix the encased head portion to one of the battery cells, the extending portion may be provided with a first extending portion and a second extending portion, the first extending portion may be formed into a first shape corresponding to an outer surface of one of the battery cells, and the second extending portion may be formed into a second shape corresponding to an outer surface of the other battery cell after being inserted between the two battery cells.

The battery cells may include cylinder-type battery cells, and the head portion of the temperature measuring member may be provided in the space between neighboring cylinder-type battery cells.

As described above, according to the present invention, it is possible to provide a battery pack using a new temperature measuring member.

Further, it is possible to provide a battery pack having an improved temperature control capability of battery cells.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, an embodiment of the present invention will be described with reference to the accompanying drawings.

Figure 1A:
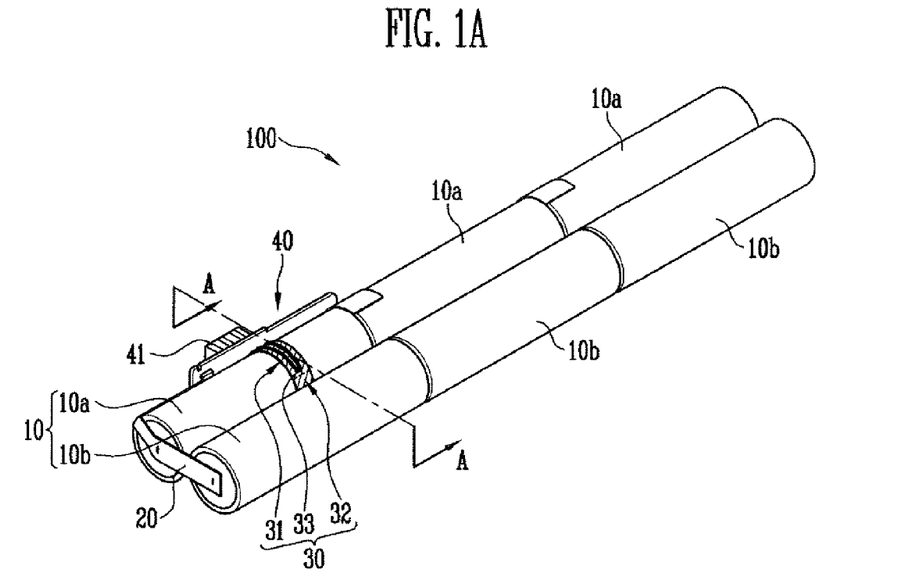
FIG. 1A is a perspective view of a battery pack according to an embodiment of the present invention.
Figure 1B:
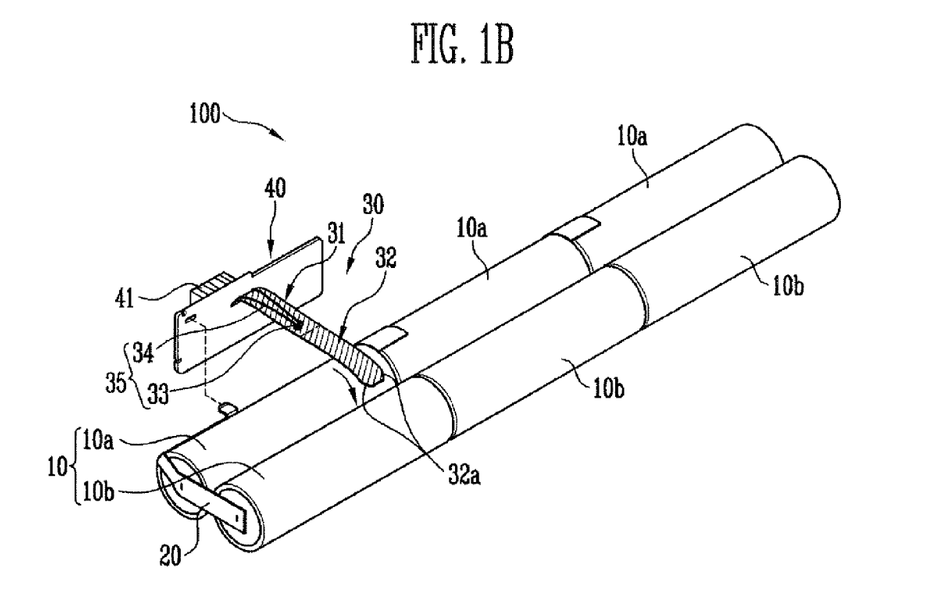
FIG. 1B is an exploded perspective view of FIG. 1A.

FIG. 1A is a perspective view of a battery pack according to an embodiment of the present invention. FIG. 1B is an exploded perspective view of FIG. 1A.

The battery pack 100 according to this embodiment includes two or more battery cells 10 comprised of first and second battery cells 10a and 10b arranged parallel to each other in a length direction thereof, wherein the battery cells 10a and 10b may be electrically connected to each other by an electrode lead 20; a protection circuit module (PCM) 40 provided at an outside of the battery cell 10 so as to be electrically connected to the battery cell 10; and a temperature measuring member 30 for measuring a temperature of the battery cell 10. One end of the temperature measuring member 30 is connected to the PCM 40, and the other end of the temperature measuring member 30 is inserted between neighboring battery cells 10.

The battery cell 10 may be manufactured by accommodating an electrode assembly and an electrolyte in a battery case. Here, the electrode assembly is formed by winding or stacking a positive electrode plate, a negative electrode plate and a separator interposed between the electrode plates. The electrode assembly generates energy by an electrochemical reaction of the electrode assembly with the electrolyte, and the energy is supplied to an outside of the battery cell 10 through an electrode tab, or the like. For example, the battery case may be formed in the shape of a pouch, prism or cylinder.

The PCM 40 may include a printed circuit board (PCB) and a protection device mounted on the PCB. A connector 41 may be provided to the PCM 40. The connector 41 is a part fastened to an external electronic device, and the energy generated by the battery cell 10 is transferred to the external electronic device through the connector 41. The PCM 40 can extend the lifetime of the battery cell 10 in charging/discharging of the battery cell 10 and prevent the battery cell 10 from being short-circuited by a charger or external terminal.

Figure 2A:
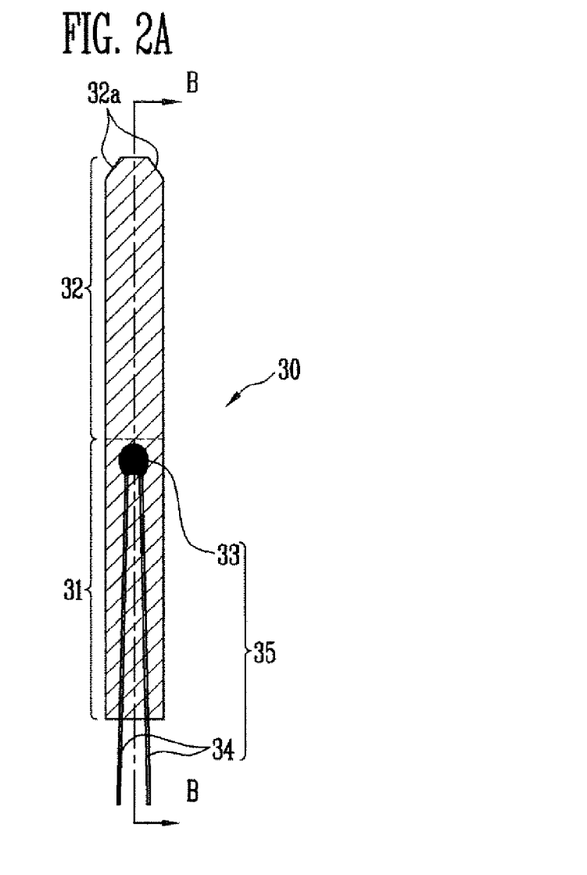
FIG. 2A is a plane view of a first embodiment of a temperature measuring member according to the invention.
Figure 2B:
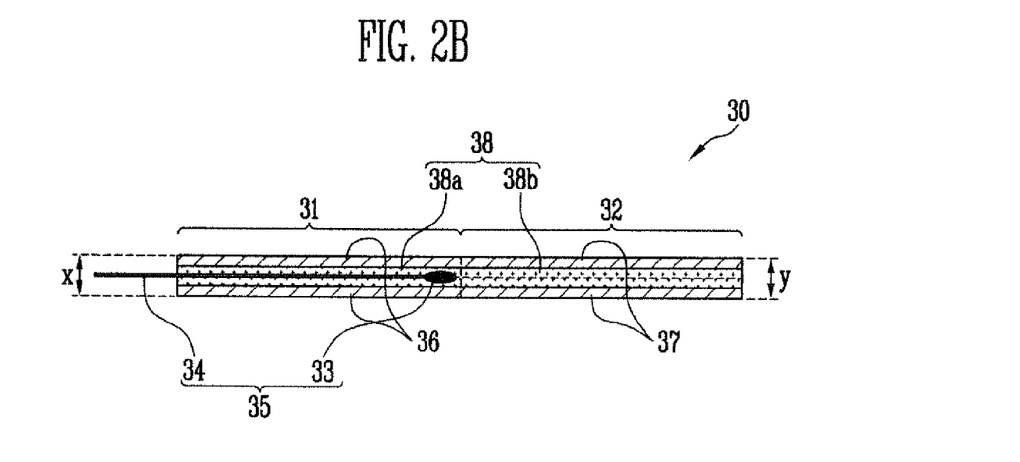
FIG. 2B is a sectional view taken along line B-B of FIG. 2A.

FIG. 2A is a plane view of a first embodiment of a temperature measuring member according to invention. FIG. 2B is a sectional view taken along line B-B of FIG. 2A.

Referring to FIGS. 1A to 2B, the temperature measuring member 30 measures a temperature of the battery cell 10a and transfers the measured temperature to the PCM 40. The one end of the temperature measuring member 30 is connected to the PCM 40, and the other end of the temperature measuring member 30 is inserted between neighboring battery cells 10a and 10b. For example, the one end of the temperature measuring member 30 may be coupled to the protection circuit module 40 by welding, soldering or the like. That is, the temperature measuring member 30 may be composed of a body portion 31 including the one end of the temperature measuring member 30 and an extending portion 32 including the other end of the temperature measuring member 30. The body portion 31 may be connected to the PCM 40 so as to transverse the battery cell 10a, and the extending portion 32 may be extended in a length direction from the body portion 31 so that at least a part of the extending portion 32 is inserted between the neighboring battery cells 10a and 10b. For example, an end 32a of the extending portion 32 may be of a tapered type. Since the end 32a of the extending portion 32 is of the tapered type, the extending portion 32 can be easily inserted between the neighboring battery cells 10a and 10b.

For example, the temperature measuring member 30 may include a sensing portion 35 having a head portion 33 and a lead line 34, and first and second film layers 36 and 37 provided as outermost surfaces of the temperature measuring member 30. The head portion 33 measures a temperature of the battery cell 10a, and a signal pertaining to the measured temperature is transferred to the PCM 40 through the lead line 34 extended from the head portion 33. The body portion 31 of the temperature measuring member 30 may be composed of the sensing portion 35 and the first film layer 36 provided to surround the sensing portion 35, and the extending portion 32 of the temperature measuring member 30 may be composed of only the second film layer 37.

The sensing portion 35 measures a temperature of the battery cell 10a through the head portion 33, and a signal according to the measured temperature is transferred to the PCM 40 through the lead line 34. The head portion 33 is a resistive element sensitive to heat, and has a characteristic that resistance is remarkably changed depending on a change in the temperature of a material to be sensed. The lead line 34 is made of a material electrically connected, and transfers the signal according to the temperature of the battery cell 10a, measured by the head portion 33, to the PCM 40. For example, the head portion 33 may include one having a characteristic of a positive or negative temperature coefficient. Here, the positive temperature coefficient means that if temperature increases, resistance increases, and the negative temperature coefficient means that if temperature increases, resistor decreases. The lead line 34 may include nickel, aluminum, etc.

In the temperature measuring member 30 according to this embodiment, the body portion 31 and the extending portion 32 may include the first and second film layers 36 and 37, respectively. The head portion 33 and the lead line 34, constituting the sensing portion 35, have a weak physical strength. The sensing portion 35 as an electrical conductor comes in contact with the battery cell 10a, and therefore, a short circuit may occur. Thus, the first film layers 36 are provided at upper and lower parts of the sensing portion 35, respectively, so that it is possible to electrically insulate the sensing portion 35 and to reinforce the mechanical strength of the sensing portion 35.

The extending portion 32 may be composed of only the second film layer 37. The second film layer 37 may be made of a material identical to or different from that of the first film layer 36 of the body portion 31. The first film layers 36 may further include one or more adhesive layers 38a provided therebetween, and the second film layers 37 may further include one or more adhesive layers 38b provided therebetween. The adhesive layers 38a and 38b provided between the first and second film layers 36 and 37 are first and second adhesive layers 38a and 38b. The first and second adhesive layers 38a and 38b may have influence on the thicknesses, strengths, pliability and flexibility of the body portion 31 and the extending portion 32, respectively.

The thickness of the temperature measuring member 30 may be changed for each of the parts. For example, the thickness x of the body portion 31 may be formed thicker than the thickness y of the extending portion 32. The thickness x of the body portion 31 and the thickness y of the extending portion 32 may be determined by the materials and thicknesses of the first and second film layers 36 and 37 and the first and second adhesive layers 38a and 38b, respectively. For example, when the thickness y of the extending portion 32 is formed thinner than the thickness x of the body portion 31, the extending portion 32 is easily inserted in between neighboring battery cells 10a and 10b. Since the body portion 31 does not pass between the battery cells 10a and 10b, it is possible to control the length of the temperature measuring member 30 inserted between the battery cells 10. Thus, it is possible to control the head portion 33 positioned at the body portion 31 from being stuck between the battery cells 10a and 10b, thereby protecting a failure due to damage of the head portion 33.

Figure 3:
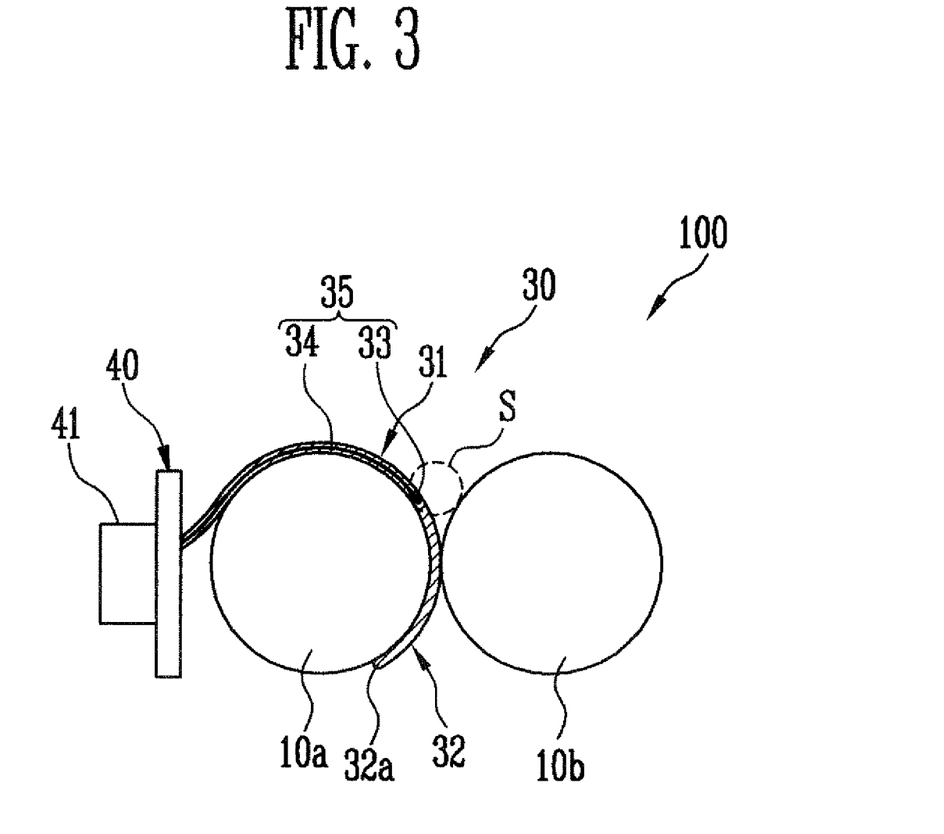
FIG. 3 is a sectional view taken along line A-A of FIG. 1A.

FIG. 3 is a sectional view taken along line A-A of FIG. 1A.

For convenience of illustration of the structure of the battery pack 100 according to this embodiment, it is assumed that one of the battery cells 10, provided adjacent to the PCM 40, is a first battery cell 10a and another of the battery cells 10, disposed parallel to the first battery cell 10a, is a second battery cell 10b.

The temperature measuring member 30 is provided to the first battery cell 10a so that the one end of the temperature measuring member 30 is first coupled to the PCM 40 and the other end of the temperature measuring member 30 is then inserted between the first and second battery cells 10a and 10b. In order to measure an exact temperature of the first battery cell 10a, the temperature measuring member 30 is attached to the first battery cell 10a so that the head portion 33 of the temperature measuring member 30 comes in close fixed contact with the first battery cell 10a. In addition, the head portion 33 is safely mounted in a space S provided between the first and second battery cells 10a and 10b so as to prevent damage of the head portion 33.

Typically, when a temperature measuring member is provided to a battery cell, a lift-off phenomenon occurs between the temperature measuring member and the battery cell, and therefore, it is difficult to measure an exact temperature of the battery cell. When a head portion of the temperature measuring member is safely mounted at another part except the space between the battery cells, e.g., when the battery cells are accommodated in a housing, the head portion may be damaged due to the interference between the housing and the head portion.

In order to measure an exact temperature of the battery cell, thermal conductive silicon is coated between the battery cell and the side of the head portion of the temperature measuring member, and a tape is attached on the thermal conductive silicon. When the amount of the coated silicon is not sufficient, the lift-off phenomenon of the temperature measuring member occurs. When the silicon is excessively used, it takes a period of time to dry the silicon, and a failure is caused in the subsequent process of attaching the tape on the silicon.

In the battery pack according to this embodiment, silicon used for the temperature measuring member, a silicon dispenser and the like can be omitted, thereby reducing material cost and processing cost. Further, the temperature measuring member can be fixedly and removably attached to the battery cell without using a separate member. Thus, the temperature of the battery cell can be exactly measured, so that it is possible to improve the safety of the battery pack and to decrease a failure rate caused by the lift-off phenomenon, etc.

Referring to FIG. 3, the temperature measuring member 30 may be provided to transverse the first battery cell 10a. The body portion 31 of the temperature measuring member 30 traverses the first battery cell 10a in a transverse direction of first battery cell 10a, and may be provided so that the head portion 33 of the temperature measuring member 30 is safely mounted in the space S between the first and second battery cells 10a and 10b. The extending portion 32 of the temperature measuring member 30 is inserted between the first and second battery cells 10a and 10b so as to surround the first battery cell 10a.

The temperature measuring member 30 may be provided to surround the first battery cell 10a along an outside of the first battery cell 10a. Thus, the temperature measuring member 30 and the first battery cell 10a come in close contact with each other, and accordingly, the temperature measuring member 30 can exactly measure the temperature of the first battery cell 10a. The temperature measuring member 30 is pliably formed into a shape corresponding to an outside surface of the battery cell. Here, the temperature measuring member 30 is formed into a partial ring shape so as to partially surround the first battery cell 10a after being inserted between the first and second battery cells 10a and 10b. Thus, the temperature measuring member 30 can be firmly fixed to the first battery cell 10a without being moved by an external force such as a drop or a vibration.

The body portion 31 and the extending portion 32 in the temperature measuring member 30 may be formed to have a predetermined length using the interval between the PCM 40 and the first battery cell 10a, the width of the first battery cell 10a, and the like. Since the temperature measuring member 30 may be formed so that the head portion 33 is provided at a predetermined position, the head portion 33 can be exactly mounted in the space S between the first and second battery cells 10a and 10b without performing, for example, a process of silicon coating, taping, etc.

In this embodiment, it has been described that the battery cells 10 are the first and second battery cells 10a and 10b. However, it is sufficient that the temperature measuring member 30 is inserted between neighboring battery cells 10, and therefore, the present invention is not limited the number and shape of the battery cells.

Hereinafter, other embodiments of the temperature measuring member will be described with reference to FIGS. 4 to 9. Contents described in the embodiments of FIGS. 4 to 9 are similar to those described with respect to FIGS. 1A to 3, except the following contents, and therefore, their detailed descriptions will be omitted.

Figure 4:
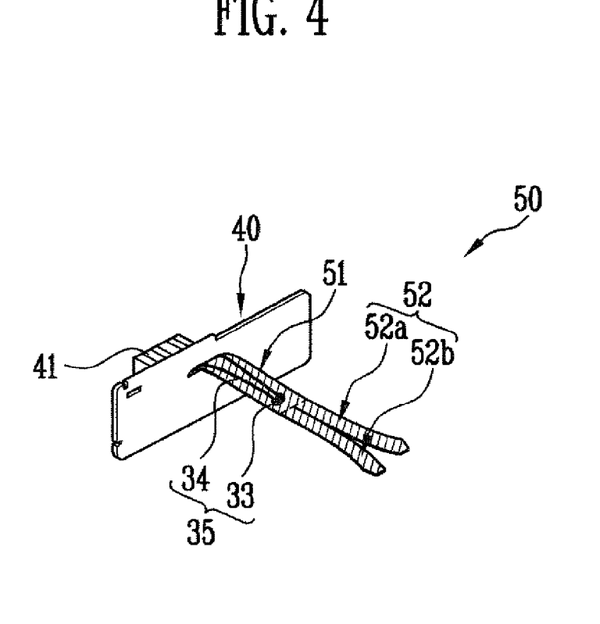
FIG. 4 is a perspective view of a protection circuit module and a second embodiment of a temperature measuring member according to the invention.
Figure 5:
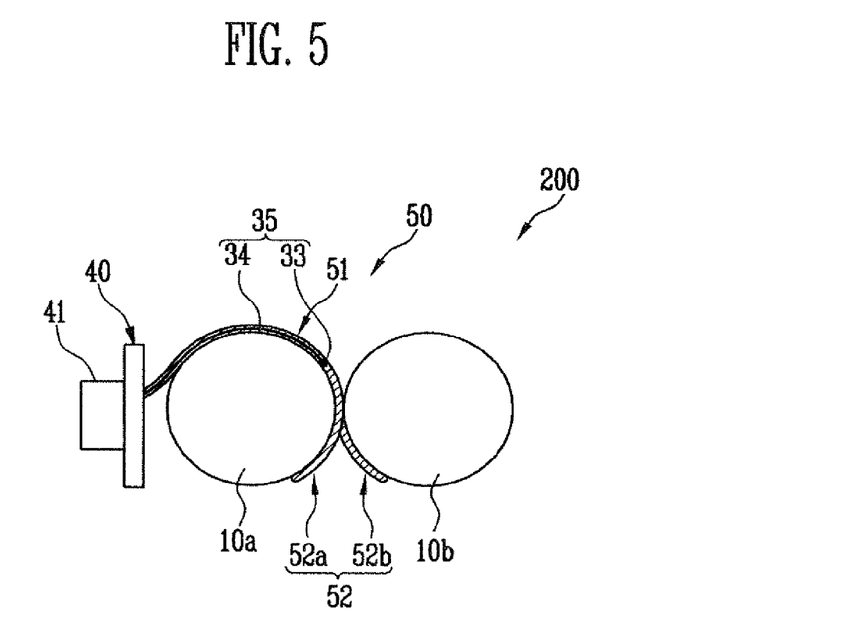
FIG. 5 is a sectional view of a battery pack according to the second embodiment.

FIG. 4 is a perspective view of a protection circuit module and a second embodiment of a temperature measuring member according to the invention. FIG. 5 is a sectional view of a battery pack according to the second embodiment.

Referring to FIGS. 4 and 5, the battery pack 200 according to this embodiment includes first and second battery cells 10a and 10b arranged in parallel in a length direction thereof, a PCM 40 provided to an outside of the first battery cell 10a, and a temperature measuring member 50. The temperature measuring member 50 is connected to the PCM 40 so as to transverse the first battery cell 10a. Thus, the temperature measuring member 50 can be inserted between the first and second battery cells 10a and 10b. The temperature sensing member 50 may be composed of a body portion 51 including a sensing portion 35 and an extending portion 52 extended in a length direction from the body portion 51. The extending portion 52 may include first and second extending portions 52a and 52b. The first and second extending portions 52a and 52b may be provided to be individually connected to the body portion 51.

The first and second extending portions 52a and 52b of the temperature measuring member 50 may be inserted between the first and second battery cells 10a and 10b. Then, the first extending portion 52a may be bent in a shape corresponding to an outer surface of the first battery cell 10a, and the second extending portion 52b may be bent in a shape corresponding to an outer surface of the second battery cell 10b in the opposite direction to that of the first extending portion 52a.

After the first and second extending portions 52a and 52b are inserted between the first and second battery cells 10a and 10b, the first and second extending portions 52a and 52b are bent in the opposite directions to each other, but are not limited thereto. Thus, it is possible to prevent up-and-down movements of the temperature measuring member 50, and accordingly, it is possible to prevent the temperature measuring member 50 from coming off the first and second battery cells 10a and 10b. The first extending portion 52a is bent to surround the first battery cell 10a, and thus it is also possible to prevent left-and-right movements of the temperature measuring member 50. That is, it is possible to prevent the up-and-down and left-and-right movements of the temperature the temperature measuring member 50 according to this embodiment, and accordingly, the temperature measuring member 50 can be firmly fixed between the PCM 40 and the first battery cell 10a.

Figure 6:
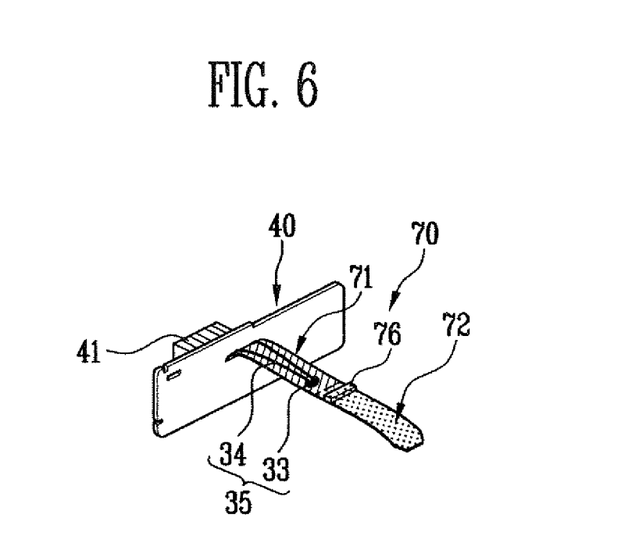
FIG. 6 is a perspective view of a protection circuit module and a third embodiment of a temperature measuring member according to the invention.
Figure 7:
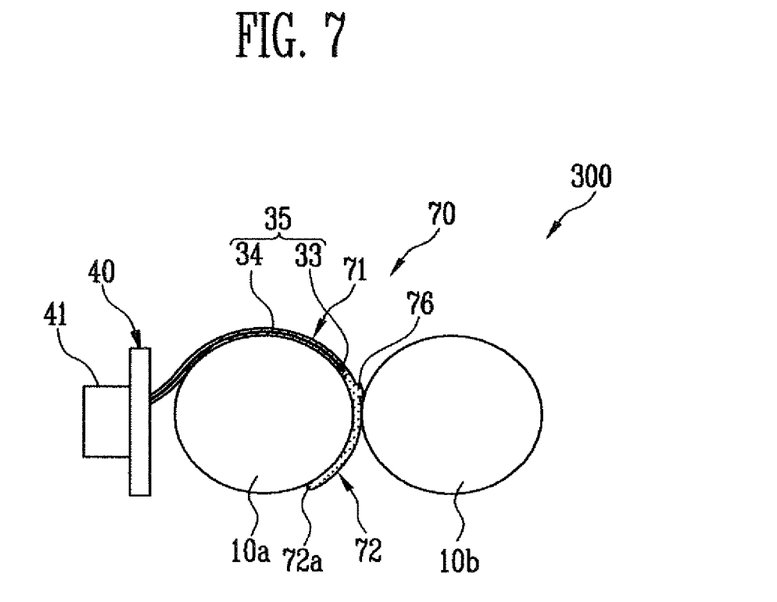
FIG. 7 is a sectional view of a battery pack according to the third embodiment.

FIG. 6 is a perspective view of a protection circuit module and a third embodiment of a temperature measuring member according to the invention. FIG. 7 is a sectional view of a battery pack according to the third embodiment.

Referring to FIGS. 6 and 7, the battery pack 300 according to this embodiment includes first and second battery cells 10a and 10b arranged in parallel in a length direction thereof, a PCM 40 provided to an outside of the first battery cell 10a, and a temperature measuring member 70. The temperature sensing member 70 may be composed of a body portion 71 including a sensing portion 35 and an extending portion 72 connected to the body portion 71. The body portion 71 may be made of a material different from that of the extending portion 72. The temperature measuring member 70 may be manufactured by coupling the body portion 71 and the extending portion 72, which are individually formed. For example, the body portion 71 may employ a tape shape thermistor, and the extending portion 72 may be made of a material capable of being easily inserted between the first and second battery cells 10a and 10b.

The temperature measuring member 70 may further include a stopper 76 provided to the extending portion 72. The stopper 76 is provided at apart adjacent to the body portion 71, which is an end of the extending portion 72, so as to control the length of the extending portion 72 inserted between the first and second battery cells 10a and 10b. The first and second battery cells 10a and 10b may be spaced apart from each other so as to provide a space therebetween, and the stopper 76 may be formed larger than the narrowest part in the space provided between the first and second battery cells 10a and 10b. For example, the stopper 76 may include one or more projections.

When the extending portion 72 of the temperature measuring member 70 is inserted between the first and second battery cells 10a and 10b, an end 72a of the extending portion 72 may be pulled at a rear-end of the first and second battery cells 10a and 10b. If the end 72a of the extending portion 72 is pulled with an excessive force, a part of the body portion 71 may also be inserted between the first and second battery cells 10a and 10b. Particularly, since the head portion 33 is positioned at a front-end of the body portion 71, the head portion 33 may be damaged by being held between the first and second battery cells 10a and 10b.

The temperature measuring member 70 according to this embodiment is provided with the stopper 76, so that the insertion length of the extending portion 72 can be controlled by the stopper 76. Thus, although the extending portion 72 may be pulled with an excessive force, it is possible to prevent a part of the body portion 71 from being inserted between the first and second battery cells 10a and 10b the head portion 33 is prevented from being damaged.

Figure 8:
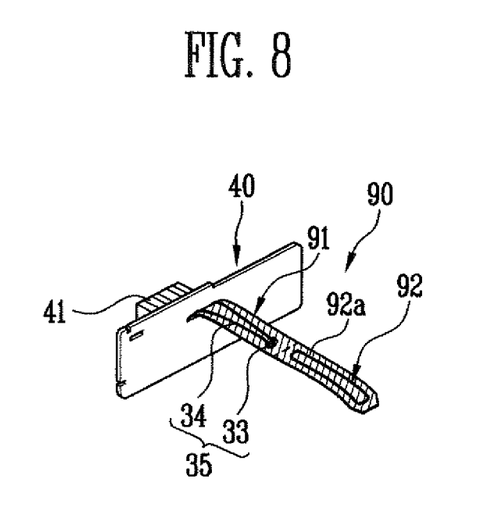
FIG. 8 is a perspective view of a protection circuit module and a fourth embodiment of a temperature measuring member according to the invention.
Figure 9:
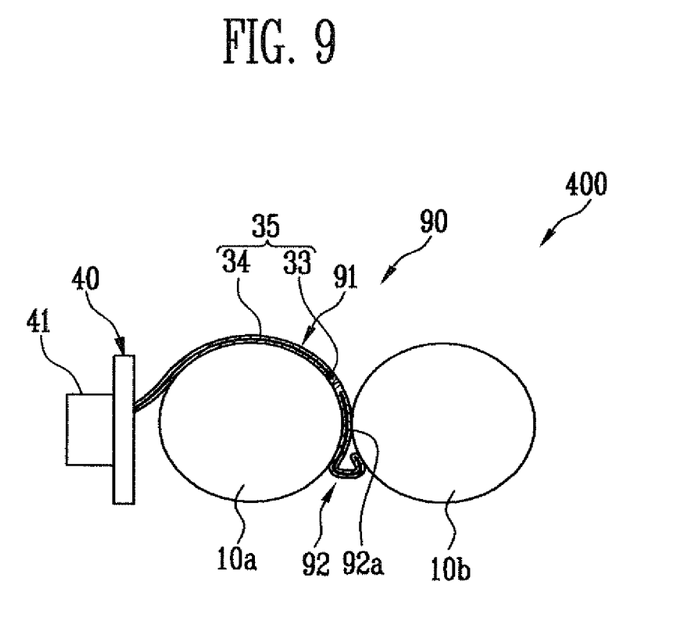
FIG. 9 is a sectional view of a battery pack according to the fourth embodiment.

FIG. 8 is a perspective view of a protection circuit module and a fourth embodiment of a temperature measuring member according to the invention. FIG. 9 is a sectional view of a battery pack according to the fourth embodiment.

Referring to FIGS. 8 and 9, the battery pack 400 is provided with a temperature measuring member 90 and a PCM 40 electrically connected to the temperature measuring member 90. The temperature measuring member 90 may be provided with a body portion 91 including a sensing portion 35 and an extending portion 92, and the extending portion 92 may further include a fixing member 92a. For example, the fixing member 92a may be made of a material such as a wire, which can reversibly modify the shape of extending portion 92.

The extending portion 92 of the temperature measuring member 90 is inserted between the first and second battery cells 10a and 10b, and the shape of the inserted extending portion 92 may be changed by a physical force. Since the shape of the extending portion 92 can be modified greater than the space provided between the first and second battery cells 10a and 10b, the extending portion 92 is fixed between the first and second battery cells 10a and 10b without easily coming off from the space between the first and second battery cells 10a and 10b. When the shape of the extending portion 92 is not modified to a target shape, the shape of the extending portion 92 can be reversibly re-modified, thereby reducing a process failure.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   at least two battery cells arranged parallel to each other;
   a protection circuit module adjacent to at least one of the battery cells; and
   a temperature measuring member attached to the protection circuit module and extending between, and in contact with, the two battery cells, the temperature measuring member measuring a temperature of said one of the battery cells, the temperature measuring member comprising:
      a body portion encasing a temperature measuring head portion to measure the temperature of said one of the battery cells, and lead lines connecting the head portion to the protection circuit module; and
      an extending portion extending a predetermined length from the body portion, the extending portion being inserted between the two battery cells and fixing the encased head portion to said one of the battery cells.

2. The battery pack as set forth in claim 1, the body portion and the extending portion being separately formed and attached to each other to form the temperature measuring member.

3. The battery pack as set forth in claim 2, the body portion being made of a first material and the extending portion being made of a second material different from the first material.

4. The battery pack as set forth in claim 1, the extending portion being arranged further from the protection circuit madule than the body portion, the body portion being interposed between the extending portion and the protection circuit module.

5. The battery pack as set forth in claim 1, the body portion having a first thickness and the extending portion having a second thickness less than the first thickness.

6. The battery pack as set forth in claim 1, the body portion having a first thickeness and the extending portion being tapered from the a first thickness to a second thickness less than the first thickness.

7. The battery pack as set forth in claim 4, the extending portion being composed of only a film layer.

8. The battery pack as set forth in claim 1, the extending portion being arranged and fixed within a nip between the two battery cells while being arranged further from the protection circuit module than the body portion.

9. The battery pack as set forth in claim 1, the temperature measuring member having a partial ring shaped that partially surrounds said one of the battery cells.

10. The battery pack as set forth in claim 1, the extending portion comprising a first extending portion and a second extending portion, the first extending portion being formed into a first tape shape that corresponds and comforms to an outer surface of said one of the battery cells, and the second extending portion being formed into a second tape shape that corresponds and comforms to an outer surface of the other battery cell after being inserted between the two battery cells.

11. The battery pack as set forth in claim 1, the extending portion being composed of only a film layer.

12. The battery pack as set forth in claim 1, the extending portion encasing a flexible wire to enable the extending portion to be formed into a desired shape after being inserted between the two battery cells to fix the extending portion between the two battery cells.

13. The battery pack as set forth in claim 1, the extending portion comprising a stopper limiting the extending portion inserted between the two battery cells to a predetermined length.

14. The battery pack as set forth in claim 13, the stopper comprising at least one protrusion.

15. A battery pack, comprising:
   at least two battery cells arranged parallel to each other;
   a protection circuit module adjacent to at least one of the battery cells; and
   a temperature measuring member attached to the protection circuit module and extending between, and in contact with, the two battery cells, the temperature measuring member measuring a temperature of said one of the battery cells, the temperature measuring member comprising:
      a body portion encasing a temperature measuring head portion to measure the temperature of said one of the battery cells, and lead lines connecting the head portion to the protection circuit module; and
      an extending portion extending a predetermined length from the body portion, the extending portion being inserted between the two battery cells and fixing the encased head portion to said one of the battery cells, the body portion and the extending portion respectufully compeising first film layers and second film layers, the first film layers of the body portion encasing a first adhesive layer, the head portion and the lead lines, and the second film layers of the extending portion encasing a second adhesive layer.

* * * * *